(12) United States Patent
Zhong

(10) Patent No.: US 11,190,576 B2
(45) Date of Patent: Nov. 30, 2021

(54) FILE DISTRIBUTION AND DOWNLOAD METHOD, DISTRIBUTION SERVER, CLIENT TERMINAL AND SYSTEM

(71) Applicant: WANGSU SCIENCE & TECHNOLOGY CO., LTD., Shanghai (CN)

(72) Inventor: Jianqiang Zhong, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 741 days.

(21) Appl. No.: 16/068,059

(22) PCT Filed: Sep. 12, 2017

(86) PCT No.: PCT/CN2017/101322
§ 371 (c)(1),
(2) Date: Jul. 3, 2018

(87) PCT Pub. No.: WO2019/051628
PCT Pub. Date: Mar. 21, 2019

(65) Prior Publication Data
US 2021/0194950 A1    Jun. 24, 2021

(51) Int. Cl.
*H04L 29/08* (2006.01)

(52) U.S. Cl.
CPC .......... *H04L 67/06* (2013.01); *H04L 67/1078* (2013.01); *H04L 67/303* (2013.01); *H04L 67/32* (2013.01)

(58) Field of Classification Search
CPC ... H04L 67/06; H04L 67/1078; H04L 67/303; H04L 67/32
See application file for complete search history.

(56) References Cited

U.S. PATENT DOCUMENTS

| 8,812,849 B1 | 8/2014 | Ubl | |
|---|---|---|---|
| 2002/0051078 A1* | 5/2002 | Ezaki | H04N 7/088 348/466 |

(Continued)

FOREIGN PATENT DOCUMENTS

| CN | 103731451 A | 4/2014 |
|---|---|---|
| CN | 105472035 A | 4/2016 |

(Continued)

OTHER PUBLICATIONS

The China National Intelleectual Property Administration (CNIPA) The China Search Report for 201710814923.4 dated Dec. 4, 24 2019 15 Pages.

(Continued)

*Primary Examiner* — Viet D Vu

(57) ABSTRACT

A distribution method includes: receiving a file query request sent by a client terminal, and in response to the file query request, feeding back a file list to the client terminal, the file list including at least an identifier for a file currently being uploaded, wherein the file currently being uploaded includes one or more file segments and is uploaded by a file upload terminal; receiving a file download request sent by the client terminal, the file download request including an identifier of a target file and an identifier of a file segment, wherein the identifier of the target file is located in the file list; and when a target segment corresponding to the identifier of the file segment of the target file has been uploaded to the local, providing the client terminal with the target segment.

19 Claims, 6 Drawing Sheets

(56) References Cited

U.S. PATENT DOCUMENTS

| | | | |
|---|---|---|---|
| 2006/0075064 A1 | 4/2006 | Keohane et al. | |
| 2008/0178230 A1* | 7/2008 | Eyal | H04N 21/816 725/86 |
| 2009/0282159 A1* | 11/2009 | Wang | H04L 67/2814 709/231 |
| 2010/0094321 A1* | 4/2010 | Akahoshi | A61F 9/00745 606/169 |
| 2010/0241757 A1* | 9/2010 | Hu | H04L 29/08729 709/231 |
| 2011/0078116 A1* | 3/2011 | Zhang | H04L 65/4084 707/640 |
| 2014/0229582 A1 | 8/2014 | Liu et al. | |
| 2014/0289305 A1 | 9/2014 | Singh et al. | |
| 2015/0067109 A1* | 3/2015 | Tang | H04L 67/1097 709/219 |
| 2015/0074232 A1* | 3/2015 | Phillips | H04N 21/2662 709/219 |
| 2016/0044086 A1* | 2/2016 | Wallace, Jr. | H04L 67/322 709/219 |
| 2018/0316747 A1* | 11/2018 | Scrivano | H04L 67/1063 |

FOREIGN PATENT DOCUMENTS

| | | |
|---|---|---|
| CN | 105635287 A | 6/2016 |
| CN | 106101291 A | 11/2016 |
| WO | 2006125225 A2 | 11/2006 |

OTHER PUBLICATIONS

The European Patent Office (EPO) The Extended European Search Report for 17923983.5 dated Sep. 30, 2019 7 Pages.

\* cited by examiner

FILE DISTRIBUTION AND DOWNLOAD METHOD, DISTRIBUTION SERVER, CLIENT TERMINAL AND SYSTEM

CROSS-REFERENCES TO RELATED APPLICATIONS

This application is a national phase entry under 35 U.S.C § 371 of International Application No. PCT/CN2017/101322 filed on Sep. 12, 2017, the entire contents of all of which are incorporated herein by reference.

FIELD OF THE DISCLOSURE

The present disclosure generally relates to the field of network transmission technology and, more particularly, relates to a file distribution and download method, a distribution server, a client terminal, and a system thereof.

BACKGROUND

With the continuous development of Internet technology, the resources in the network are also increasing. Due to the convenience of the network and the abundance of resources, people are more and more accustomed to downloading resources from the network to the local and watching or processing them locally.

For example, many video websites currently offer video downloading. The videos that may be downloaded in the video websites are generally uploaded by the website administrators or the users to the servers of the video websites. Other users may then download the already uploaded videos from the video website servers.

It can be seen from the above that the current processes of resources uploading and downloading are relatively independent. Users may download the resources only after the resources are uploaded. However, some resources may have a large amount of data, and thus it may take users a relatively long time to wait for the resources to finish uploading, and also take users a relatively long time to download the resources. In some scenarios, such uploading and downloading processes may cause the waiting time for a user to acquire the resources to be too long. For example, when a user is chasing a popular American drama TV series, the administrator of a video website needs to spend half an hour to upload the resource to the server of the video website when s/he gets a new episode of the series. Then the user needs to spend another hour to download the resource. That is, from the time point that the administrator obtains the resource, the user needs to wait for one and a half hours to obtain the resource. If the data amount of the resource is larger, the user needs to wait even longer.

Currently, resources may be shared between different nodes. Specifically, node A may share the resource with node B after downloading the entire resource. In the sharing process, node B may download the resource at the same time while node A uploads the resource. However, a premise of this resource sharing process is that a node needs to download the entire resource to the local before sharing the resource. That is, other nodes still need to wait a certain time to allow one of the nodes to download the resource to the local. If the data amount of the resource is relatively large, the waiting time for other nodes will be relatively long.

Therefore, there is a need for a method of resource upload and download that can reduce the waiting time for users.

BRIEF SUMMARY OF THE DISCLOSURE

To solve the problems in the existing technology, embodiments of the present disclosure provide a file distribution and download method, a distribution server, a client terminal, and a system thereof. The technical solutions are as follows:

In one aspect, a file distribution method is provided. The method includes:

receiving a file query request sent by a client terminal, and in response to the file query request, feeding back a file list to the client terminal, the file list including at least an identifier for a file currently being uploaded, where the file currently being uploaded includes one or more file segments and is uploaded by a file upload terminal;

receiving a file download request sent by the client terminal, the file download request including an identifier of a target file and an identifier of a file segment, where the identifier of the target file is located in the file list; and when a target segment corresponding to the identifier of the file segment of the target file has been uploaded to the local, providing the client terminal with the target segment.

In another aspect, a distribution server is provided. The distribution server includes:

a file list feeding back unit that is configured to receive a file query request sent by a client terminal, and in response to the file query request, feed back a file list to the client terminal, the file list including at least an identifier for a file currently being uploaded, where the file currently being uploaded includes one or more file segments and is uploaded by a file upload terminal;

a file download request receiving unit that is configured to receive a file download request sent by the client terminal, the file download request including an identifier of a target file and an identifier of a file segment, where the identifier of the target file is located in the file list; and a target segment providing unit that is configured to, when a target segment corresponding to the identifier of the file segment of the target file has been uploaded to the local, provide the client terminal with the target segment.

In another aspect, a file download method is provided. The method includes:

acquiring a download task, and transmitting a file download request for a target file to a distribution server based on the download task, where the target file includes one or more file segments and is unloaded by a file upload terminal, and the file download request includes an identifier of the target file and an identifier of a file segment; and when a target segment corresponding to the identifier of the file segment of the target file has been uploaded to the distribution server, receiving the target segment provided by the distribution server.

In another aspect, a client terminal is provided. The client terminal includes:

a download request transmission unit that is configured to acquire a download task, and transmit a file download request for a target file to a distribution server, where the target file includes one or more file segments and is unloaded by a file upload terminal, and the file download request includes an identifier of the target file and an identifier of a file segment; and a segment receiving unit that is configured to, when a target segment corresponding to the identifier of the file segment of the target file has been uploaded to the distribution server, receive the target segment provided by the distribution server.

In another aspect, a file distribution system is provided. The system includes a file upload terminal, a management server, a distribution server, and a client terminal, where:

the file upload terminal is configured to upload a to-be-uploaded file to the distribution server, the to-be-uploaded file including one or more file segments;

the management server is configured to transmit a file query request to the distribution server to obtain a file list from the distribution server, the file list including at least an identifier for a file that is currently being uploaded, and build a download task corresponding to an identifier of a file included in the file list;

the client terminal is configured to acquire the download task from the management server, and transmit a file download request for a target file to the distribution server based on the download task, the file download request including an identifier of the target file and an identifier of a file segment; and the distribution server is configured to, when a target segment corresponding to the identifier of the file segment of the target file has been uploaded to the local, provide the client terminal with the target segment.

In another aspect, a file distribution system is provided. The system includes a file upload terminal, a distribution server, and a client terminal, where:

the file upload terminal is configured to upload a to-be-uploaded file to the distribution server, the to-be-uploaded file including one or more file segments;

the client terminal is configured to transmit a file query request to the distribution server to obtain a file list from the distribution server, the file list including at least an identifier for a file that is currently being uploaded, build a download task corresponding to an identifier of a file included in the file list, acquire the download task, and transmit a file download request for a target file to the distribution server based on the download task, the file download request including an identifier of the target file and an identifier of a file segment; and the distribution server is configured to, when a target segment corresponding to the identifier of the file segment of the target file has been uploaded to the local, provide the client terminal with the target segment.

As can be seen from the above, in the present disclosure, when the file upload terminal uploads a file to the distribution server, the distribution server may take the file as a downloadable file. At the same time, when uploading a file, the file upload terminal may upload the file based on the file segments, so as to ensure that the data amount of each file segment is small and the uploading speed is fast. In this way, once a file starts to get uploaded, the client terminal may create a download task for the file. As long as there is a file segment uploaded to the distribution server, the distribution server may provide the already uploaded file segment to the client terminal. That is, the client terminal may download the file from the distribution server without waiting until that the entire file has been uploaded by the file upload terminal. The client terminal may start to download the file gradually while the file is being uploaded by the file upload terminal. This saves the time of the client terminal to wait for the entire file to be uploaded, so that the client terminal may obtain the corresponding file more quickly, thereby reducing the required waiting time for the user.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions, and advantages of the present disclosure clearer, specific embodiments of the present disclosure will be made in detail with reference to the accompanying drawings.

Embodiment 1

Figure 1:
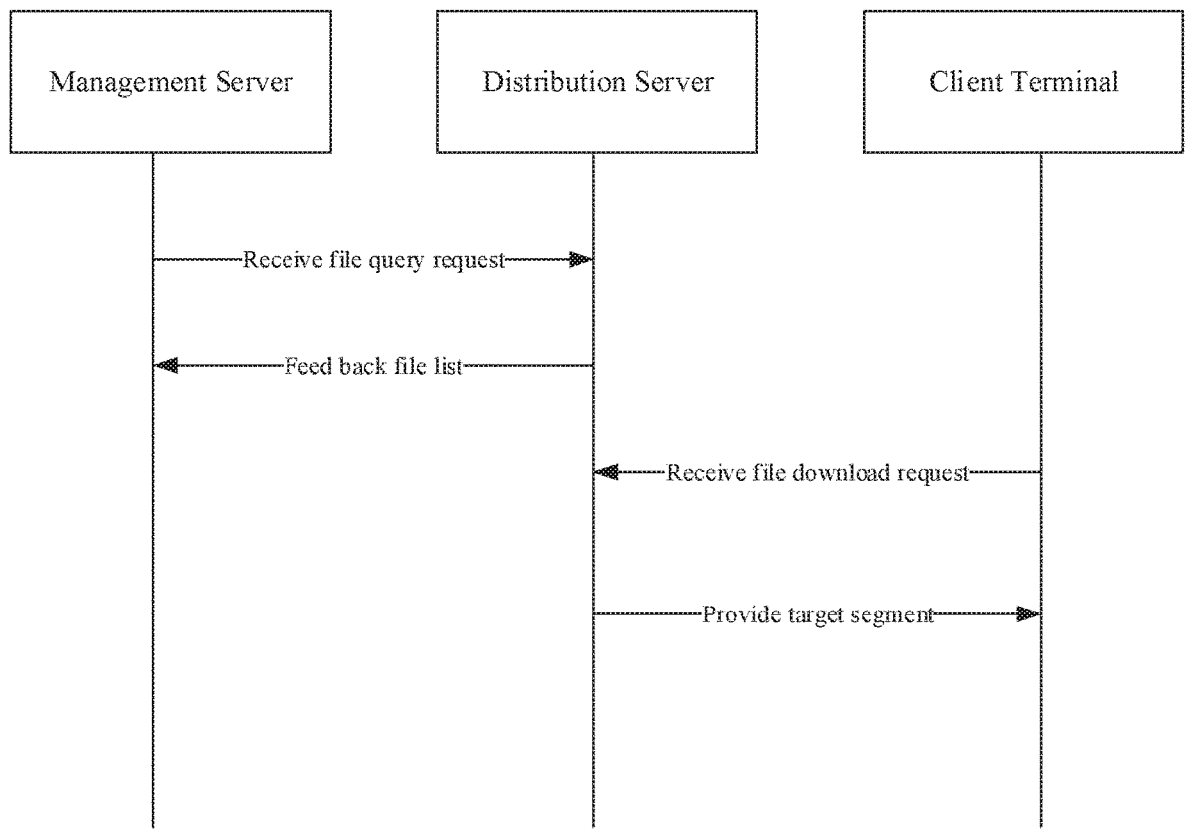
FIG. 1 is a flowchart of a file distribution method according to Embodiment 1 of the present disclosure.

The present disclosure provides a file distribution method that may be applied to a distribution server. The distribution server may be a server or server cluster for storing files. Referring to FIG. 1, the method includes the following steps.

S11: receiving a file query request sent by a management server, and in response to the file query request, feeding back a file list to the management server, the file list including at least an identifier for a file currently being uploaded, where the file currently being uploaded includes one or more file segments and is uploaded by a file upload terminal.

In the disclosed embodiment, a file in the distribution server may be uploaded by a file upload terminal. When uploading the file, the file upload terminal may upload the entire file, or upload the file based on the file segments. Specifically, the data amount of each file segment may be specified in advance, so that the file upload terminal may split the file according to the specified data amount when the file is split. For example, the data amount of each file segment may be set as 20 M. When the total data amount of the file is less than or equal to 20 M, the file may be uploaded as a single file segment. When the total data amount of the file is greater than 20 M, the file may be split according to the data amount of 20 M, so that the data amount of each file segment will not be greater than 20 M.

In the disclosed embodiment, after splitting a to-be-uploaded file into file segments, the file upload terminal may assign a corresponding identifier to each file segment. For example, numbering may be performed for the data based on where the file segment is located in the file. In this way, assuming that the to-be-uploaded file is split into 10 file segments, numbers 1 to 10 may be sequentially assigned for these 10 file segments.

In the disclosed embodiment, when the file upload terminal is ready to upload the file to the distribution server, information for the to-be-uploaded file may be sent to the distribution server first. The information may include, for example, the name of the file, the storage path of the file in the file upload terminal, the total data amount of the file, the time of the most recent modification of the file, the number of split file segments, and the identifier of each file segment.

After the information of the to-be-uploaded file is sent to the distribution server, the transmission process for the file segments may be started.

In addition, in one embodiment, after receiving the file information sent by the file upload terminal, the distribution server may build a segment index for the to-be-uploaded file based on the file information. The segment index may be used to record the storage path for each file segment in the distribution server. Specifically, in the segment index built by the distribution server, the identifier for each file segment may be filled in advance. Whenever there is a file segment that has finished uploading, the distribution server may associate the corresponding storage path with the identifier of this file segment. In this way, the segment index may include an association relationship between the identifier of the file segment that has finished uploading and the storage path in the local for the file segment that has finished uploading.

In the disclosed embodiment, the distribution server may also record the upload status for each file segment of the to-be-uploaded file. The upload status may be initially set as "not uploaded". When a file segment has finished uploading, the distribution server may modify the upload status of the uploaded file segment to "uploaded". Through the upload statuses of the file segments, file segments that currently have finished uploading and file segments that currently have not finished uploading may then be determined. It should be noted that when recording the upload status of a file segment, the distribution server may use predefined characters to label the upload status. For example, the distribution server may use 1 to indicate "uploaded", and use 0 to indicate "not uploaded". It is to be understood that, in actual application scenarios, the characters may be also embodied by various other approaches, which the present disclosure does not intend to limit.

In the disclosed embodiment, the distribution server may include a file list. The file list may include identifiers of files that have finished uploading in the distribution server, and may also include identifiers for the files currently being uploaded. Whenever there is a change in the upload status of a file, the content of the file list may be changed accordingly. It should be noted that what is recorded in the file list are the identifiers of the files, but not the identifiers of the file segments. That is, if there is a change in the upload status of a file segment, the content of the file list does not necessarily change.

In the disclosed embodiment, when the distribution server receives a file query request sent by the management server, the distribution server may feed back the file list to the management server in response to the file query request. The management server may be a server for creating download tasks. The management server may obtain an up-to-date file list from the distribution server at a fixed time interval, and may create a download task for a corresponding file based on the identifiers of the files recorded in the file list. It should be noted that the management server usually only creates the download task for a file but does not itself actively download the file. The purpose of creating the download task by the management server is to provide the download task to the client terminal of a user so that the client terminal of the user may download the corresponding file.

S13: receiving a file download request sent by the client terminal, where the file download request includes an identifier of a target file and an identifier of a file segment, and the identifier of the target file is located in the file list.

In the disclosed embodiment, after the management server creates the download task for a file, the client terminal may obtain the download task from the management server, and send a file download request for the target file to the distribution server based on the download task. The client terminal may be a terminal device used by a user. For example, the client terminal may be a desktop computer, a laptop, a smartphone, a smart wearable device, etc. Apparently, the client terminal may also include software running on the aforementioned terminal devices.

In the disclosed embodiment, the client terminal may access the management server so that a download task corresponding to a currently downloadable file may be identified. In this way, by receiving an instruction from the user, the client terminal may pull the download task corresponding to the target file from the management server. In the download task, the file name of the target file may be included. In this way, the client terminal may add the pulled download task to the download list in the local, so that the file download request for the target file may be transmitted to the distribution server.

In the disclosed embodiment, the file download request transmitted by the client terminal may include the identifier of the target file and the identifier of the file segment. Specifically, the identifier of the target file may be the file name of the target file. If it is the first time that the client terminal downloads the target file, the client terminal may add a file segment identifier corresponding to the first file segment of the target file to the file download request. In the case that the client terminal has already downloaded certain file segments of the target file, and starts to resume downloading the target file, the client terminal may check the identifiers of the file segments that have been downloaded to the local and determine the identifier of the next file segment to be downloaded, thereby adding the identifier of the next to-be-downloaded file segment into the file download request. For example, the client terminal has previously downloaded the file segments numbered 1 to 3 in the target file. When the downloading of the target file is resumed, the identifier of a file segment that is numbered 4 may be added to the file download request. It should be noted that sometimes when the target file is downloaded for the first time, the identifier of the file segment in the file download request may be also left blank. In the case of the identifier of the file segment left blank, the distribution server may provide the client terminal with the first file segment of the target file by default.

In this way, the distribution server may receive the file download request sent by the client terminal.

S15: when a target segment corresponding to the identifier of the file segment of the target file has been uploaded to the local, providing the client terminal with the target segment.

In the disclosed embodiment, the distribution server may receive a file download request sent by the client terminal, and extract the identifier of the target file and the identifier of the file segment from the file download request, so that it may be determined which file segment in which file the client terminal needs to download currently. In this way, the distribution server may check whether there exists an identifier, in a local segment index, corresponding to the file segment included in the file download request. If there exists an identifier, in a local segment index, corresponding to the file segment included in the file download request, it indicates that the file segment corresponding to the identifier of the file segment has finished uploading. In this way, the distribution server may determine the target storage path associated with the identifier for the file segment in the segment index and provide the file segment stored under the target storage path to the client terminal. That is, in the case that the target segment corresponding to the identifier of the file segment of the target file has been uploaded to the local, the distribution server may provide the client terminal with the target segment. If there does not exist an identifier, in a local segment index, corresponding to the file segment included in the file download request, it indicates that the file segment corresponding to the identifier of the file segment has not been uploaded yet. In this case, the distribution server may feed back a suspend instruction to the client terminal, so that the client terminal suspends downloading the target file according to the suspend instruction. Specifically, the suspend instruction may include a specified status code. The client terminal may identify the specified status code and determine that it is necessary to suspend downloading the target file at this point. The specified status code may be a digital code, such as 204, 303, etc. That is, in the case that the target segment corresponding to the identifier of the file segment of the target file has not been uploaded to the local, the distribution server may feed back a suspend instruction to the client terminal, so that the client terminal may suspend downloading the target file according to the suspend instruction.

In the disclosed embodiment, when receiving the suspend instruction sent by the distribution server, the client terminal may suspend downloading the target file. At this moment, the client terminal may inspect the current download list. If there are other tasks that need to be downloaded in the download list, the download process for another file in the download list may then be executed. After finishing the execution of that download process, the client terminal may re-transmit the file download request for the target file to the distribution server. In this way, the client terminal may make full use of the time in file downloading.

Additionally, if there is no other file to be downloaded in the download list, the client terminal may re-transmit the file download request for the target file to the distribution server when the suspension duration reaches a specified duration threshold. For example, the client terminal may wait for 20 seconds by default after receiving a suspend instruction. After 20 seconds, the client terminal may re-transmit the file download request.

In an actual application scenario, the distribution server may estimate the length of time that the client terminal needs to wait based on the average file uploading speed of the file upload terminal and the data amount of the file segment currently being uploaded. For example, the data amount of the file segment currently being uploaded is 30 M, and the average file uploading speed of the file upload terminal is 1 M/s. Accordingly, in the suspend instruction fed back to the client terminal, the distribution server may add a suspend duration of 30 seconds. In this way, after 30 seconds, the client terminal may re-transmit the file download request to the distribution server.

In one embodiment, in order to ensure that the file uploaded by the file upload terminal is correct, the distribution server may verify a received file segment. Specifically, after receiving an instant file segment uploaded by the file upload terminal, the distribution server may determine a first check code corresponding to the received instant file segment. The first check code may be obtained by calculating the data of the file segment using a hash function. For example, the first check code may be an MD5 code calculated using the fifth edition of Message Digest Algorithm (MD5). The first check code may be also a hash value. The distribution server may then compare the first check code with the first check code sent by the file upload terminal for the instant file segment. When uploading a file segment, the file upload terminal usually sends a first check code associated with the file segment to the distribution server at the same time. If the first check code calculated by the distribution server is the same as the first check code sent by the file upload terminal, the content of the file segment uploaded by the file upload terminal and the instant file segment received by the distribution server are also the same, which indicates that there is no abnormality in the transmission of the file segment. At this point, the distribution server may modify the upload status of the instant file segment as "uploaded". If the two first check codes are different, it indicates that the transmission of the file segment is abnormal. At this point, the distribution server may delete the received instant file segment from the local, and feed back an error message to the file upload terminal, to allow the file upload terminal to re-upload the instant file segment.

It can be seen from the above that the first check code needs to be calculated by the file upload terminal and the distribution server separately. The file upload terminal may calculate a first check code for the uploading file segment, while the distribution server may calculate a first check code based on the received instant file segment. By comparing the two first check codes, it may be determined whether an abnormality occurs during the data transmission between the file upload terminal and the distribution server.

In one embodiment, after the distribution server provides the client terminal with the file segment, the client terminal may also employ a file verification approach to verify whether the received file segment is correct. Specifically, when providing the target segment to the client terminal, the distribution server may provide the client terminal with a second check code of the target segment, so that the client terminal may verify whether the content of the downloaded target segment is correct based on the second check code. The second check code may be a hash value calculated by the distribution server using a hash algorithm. In this way, after receiving the target segment, the client terminal may determine the second check code corresponding to the received target segment using the same hash algorithm, and compare the determined second check code with the second check code sent by the distribution server for the target segment. If the two second check codes are the same, it indicates that there is no abnormality in the transmission process for the target segment provided by the distribution server. The client terminal may thus retain the received target segment in the local. If the two second check codes are different, it indicates that the target segment provided by the distribution server has an abnormality in the transmission process. At this point, the client terminal may delete the received target segment from the local, and feed back an error message to the distribution server to re-acquire the target segment from the distribution server.

It can be seen from the above that the second check code needs to be calculated by the client terminal and the distribution server separately. The distribution server may calculate a second check code based on the target segment currently being delivered, while the client terminal may obtain a second check code through calculation of the currently received target segment. By comparing these two second check codes, it may be determined whether there is an abnormality during data transmission between the distribution server and the client terminal.

In one embodiment, since the file list obtained by the management server may include the identifiers of files that have already been uploaded into the distribution server, the file download request sent by the client terminal to the distribution server may be also for a file that has finished uploading. In this case, after receiving the file download request sent by the client terminal, the distribution server may determine whether the identifier of the target file included in the file download request is the identifier for a file currently being uploaded. If it is not the identifier for a file currently being uploaded, it indicates what the client terminal currently requests to download is a file that has finished uploading. The distribution server may then directly provide the client terminal with the target file that has finished uploading. If it is the identifier for a file currently being uploaded, it indicates what the client terminal requests to download is a file currently being uploaded. The distribution server may then further determine whether the target segment corresponding to the identifier of the file segment of the target file has been uploaded to the local.

Embodiment 2

Figure 2:
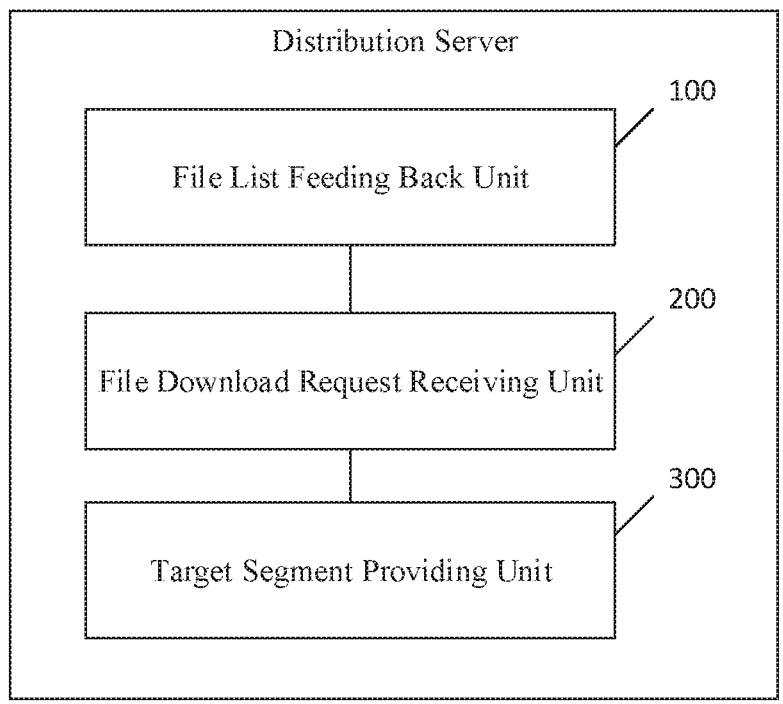
FIG. 2 is a structural diagram of a distribution server according to Embodiment 2 of the present disclosure.

Referring to FIG. 2, the present disclosure further provides a distribution server, where the distribution server includes:

a file list feeding back unit 100 that is configured to receive a file query request sent by a management server, and in response to the file query request, feed back a file list to the management server, where the file list includes at least an identifier for a file currently being uploaded, and the file currently being uploaded includes one or more file segments and is uploaded by a file upload terminal;

a file download request receiving unit 200 that is configured to receive a file download request sent by a client terminal, where the file download request includes an identifier of a target file and an identifier of a file segment, and the identifier of the target file is located in the file list; and a target segment providing unit 300 that is configured to, when a target segment corresponding to the identifier of the file segment of the target file has been uploaded to the local, provide the client terminal with the target segment.

In one embodiment, the distribution server further includes:

a suspend instruction feeding back unit that is configured to, when that the target segment corresponding to the identifier of the file segment of the target file has not been uploaded to the local, feed back a suspend instruction to the client terminal to allow the client terminal suspend downloading the target file according to the suspend instruction.

In one embodiment, the distribution server further includes:

a segment index building unit that is configured to receive file information sent by the file upload terminal, and build a segment index for a to-be-uploaded file based on the file information, where the segment index includes an association relationship between an identifier for a file segment that has finished uploading and a storage path in the local for the file segment that has finished uploading; and an upload status recording unit that is configured to record an upload status for each file segment of the to-be-uploaded file, where the upload status is initially set as not uploaded, and when a file segment has finished uploading, the upload status for the file segment that has finished uploading is changed to uploaded.

In one embodiment, the distribution server further includes:

a segment checking unit that is configured to check whether there exists an identifier, in a local segment index, corresponding to the file segment included in the file download request;

a first processing unit that is configured to, if there exists an identifier, in a local segment index, corresponding to the file segment included in the file download request, determine a target storage path associated with the identifier for the file segment in the local segment index, and provide a file segment stored under the target storage path to the client terminal; and a second processing unit that is configured to, if there does not exist an identifier, in a local segment index, corresponding to the file segment included in the file download request, feed back a suspend instruction to the client terminal, to allow the client terminal to suspend downloading the target file according to the suspend instruction.

Each embodiment in this specification is described in a progressive manner. The same or similar parts in each embodiment may be referred to each other. Each embodiment focuses on the difference from other embodiments. In particular, for the embodiments with respect to the distribution servers, reference may be made in detail to the foregoing embodiments of the file distribution methods.

Embodiment 3

Figure 3:
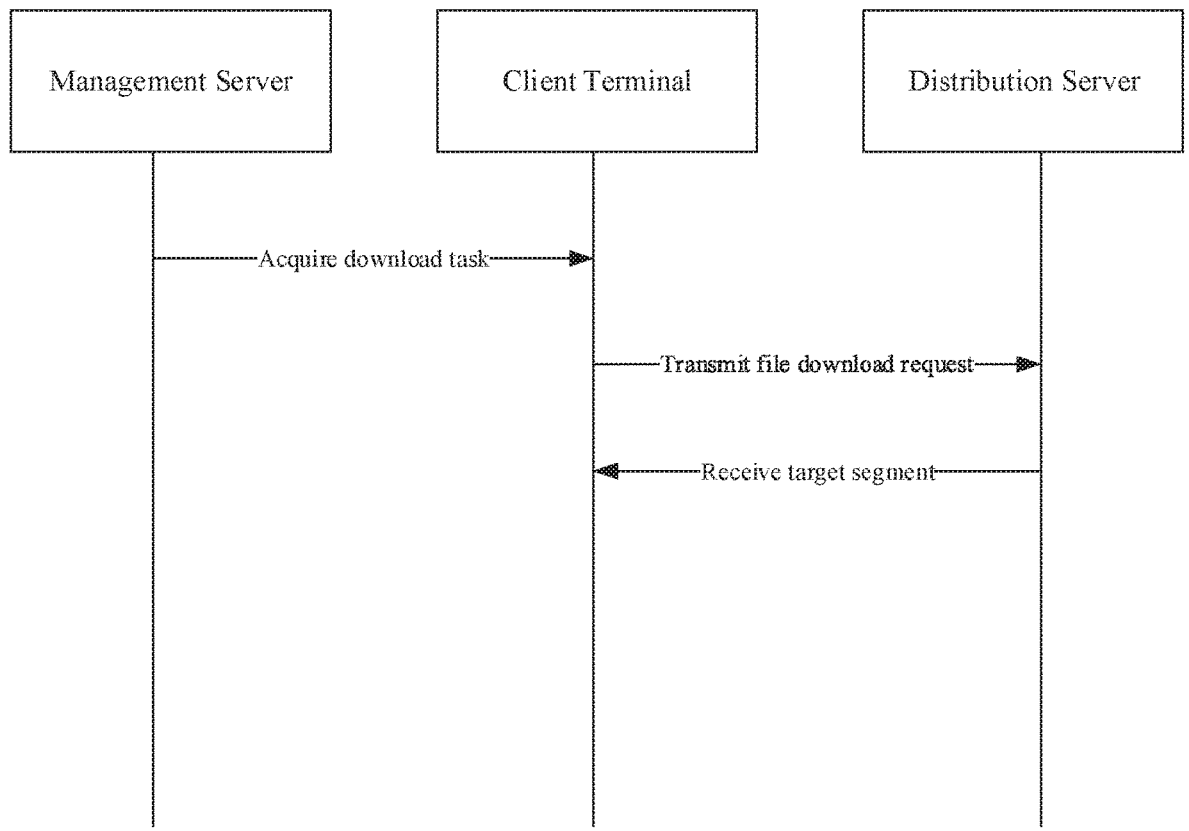
FIG. 3 is a flowchart of a file download method according to Embodiment 3 of the present disclosure.

Referring to FIG. 3, the present disclosure further provides a file download method. The method may be applied to a client terminal, where the client terminal may be a terminal device used by a user. For example, the client terminal may be a desktop computer, a laptop, a smartphone, a smart wearable device, etc. Apparently, the client terminal may also include software running on the aforementioned terminal devices. The method includes the following steps.

S21: acquiring a download task from a management server, and transmitting a file download request for a target file to a distribution server based on the download task, where the target file includes one or more file segments and is unloaded by a file upload terminal, and the file download request includes an identifier of the target file and an identifier of a file segment.

In the disclosed embodiment, a file in the distribution server may be uploaded by a file upload terminal. When uploading the file, the file upload terminal may split the file into one or more file segments in advance. Specifically, the data amount of each file segment may be specified in advance, so that the file upload terminal may split the file according to the specified data amount when the file is split.

In the disclosed embodiment, after splitting a to-be-uploaded file into file segments, the file upload terminal may assign a corresponding identifier to each file segment. For example, numbering may be performed based on where the file segment is located in the file. In this way, assuming that the to-be-uploaded file is split into 10 file segments, numbers 1 to 10 may be sequentially assigned for these 10 file segments.

In the disclosed embodiment, the distribution server may include a file list. The file list may include identifiers for files that have finished uploading in the distribution server, and may also include identifiers for the files currently being uploaded. Whenever there is a change in the upload status of a file, the content of the file list may be changed accordingly. It should be noted that what is recorded in the file list are the identifiers of the files, but not the identifiers of the file segments. That is, if there is a change in the upload status of a file segment, the content of the file list does not necessarily change.

In the disclosed embodiment, when the distribution server receives a file query request sent by the management server, the distribution server may feed back the file list to the management server in response to the file query request. The management server may be a server for creating download tasks. The management server may obtain an up-to-date file list from the distribution server at a fixed time interval, and may create a download task for a corresponding file based on the identifiers of the files recorded in the file list. It should be noted that the management server usually only creates the download task for a file but does not itself actively download the file. The purpose of creating the download task by the management server is to provide the download task to the client terminal of a user so that the client terminal of the user may download the corresponding file.

In the disclosed embodiment, after the management server creates a download task for a file, the client terminal may obtain the download task from the management server, and send a file download request for the target file to the distribution server based on the download task. Specifically, the client terminal may access the management server so that a download task corresponding to a currently downloadable file may be obtained. In this way, by receiving an instruction from the user, the client terminal may pull the download task corresponding to the target file from the management server. In the download task, the file name of the target file may be included. In this way, the client terminal may add the pulled download task to the download list in the local, so that a file download request for the target file may be transmitted to the distribution server.

In the disclosed embodiment, the file download request transmitted by the client terminal may include the identifier of the target file and the identifier of the file segment. Specifically, the identifier of the target file may be the file name of the target file. If it is the first time that the client terminal downloads the target file, the client terminal may add a file segment identifier corresponding to the first file segment of the target file to the file download request. In the case that the client terminal has already downloaded certain file segments of the target file, and starts to resume downloading the target file, the client terminal may check the identifiers of the file segments that have been downloaded to the local and determine the identifier of the next file segment to be downloaded, thereby adding the identifier of the next to-be-downloaded file segment into the file download request. For example, the client terminal has previously downloaded the file segments numbered 1 to 3 in the target file. When the downloading of the target file is resumed, the identifier of a file segment that is numbered 4 may be added to the file download request. It should be noted that sometimes when the target file is downloaded for the first time, the identifier of the file segment in the file download request may be also left blank. In the case of the identifier of the file segment left blank, the distribution server may provide the client terminal with the first file segment of the target file by default.

S23: when a target segment corresponding to the identifier of the file segment of the target file has been uploaded to the distribution server, receiving the target segment provided by the distribution server.

In the disclosed embodiment, the distribution server may receive a file download request sent by the client terminal, and extract the identifier of the target file and the identifier of the file segment from the file download request, so that it may be determined which file segment in which file the client terminal needs to download currently. In this way, the distribution server may check whether there exists an identifier, in a local segment index, corresponding to the file segment included in the file download request. If there exists an identifier, in a local segment index, corresponding to the file segment included in the file download request, it indicates that the file segment corresponding to the identifier of the file segment has been uploaded. In this way, the distribution server may determine the target storage path associated with the identifier for the file segment in the segment index and provide the file segment stored under the target storage path to the client terminal. That is, in the case that the target segment corresponding to the identifier of the file segment of the target file has been uploaded to the local, the client terminal may receive the target segment provided by the distribution server. If there does not exist an identifier, in a local segment index, corresponding to the file segment included in the file download request, it indicates that the file segment corresponding to the identifier of the file segment has not been uploaded yet. In this case, the distribution server may feed back a suspend instruction to the client terminal so that the client terminal suspends downloading the target file according to the suspend instruction. Specifically, the suspend instruction may include a specified status code, and the client terminal may identify the specified status code and determine that it is necessary to suspend downloading the target file at this point. The specified status code may be a digital code, such as 204, 303, etc. That is, in the case that the target segment corresponding to the identifier of the file segment of the target file has not been uploaded to the local, the client terminal may receive a suspend instruction sent by the distribution server to suspend downloading the target file.

In the disclosed embodiment, when receiving the suspend instruction sent by the distribution server, the client terminal may suspend downloading the target file. At this moment, the client terminal may check the current download list. If there are other tasks that need to be downloaded in the download list, the download process for another file in the download list may be executed. After finishing the execution of that download process, the client terminal may re-transmit the file download request for the target file to the distribution server. In this way, the client terminal may make full use of the time in file downloading.

Additionally, if there is no other file to be downloaded in the download list, the client terminal may re-transmit the file download request for the target file to the distribution server when the suspension duration reaches a specified duration threshold. For example, the client terminal may wait for 20 seconds by default after receiving a suspend instruction. After 20 seconds, the client terminal may re-transmit the file download request.

In one embodiment, after the distribution server provides the client terminal with the file segment, the client terminal may employ a file verification approach to verify whether the received file segment is correct. Specifically, when providing the target segment to the client terminal, the distribution server may provide the client terminal with a second check code of the target segment, so that the client terminal may verify whether the content of the downloaded target segment is correct based on the second check code. The second check code may be a hash value calculated by the distribution server using a hash algorithm. In this way, after receiving the target segment, the client terminal may determine a second check code corresponding to the received target segment using the same hash algorithm, and compare the determined second check code with the second check code sent by the distribution server for the target segment. If the two second check codes are the same, it indicates that there is no abnormality in the transmission process for the target segment provided by the distribution server. The client terminal may thus retain the received target segment in the local. If the two second check codes are different, it indicates that the target segment provided by the distribution server has an abnormality in the transmission process. At this point, the client terminal may delete the received target segment from the local, and feed back an error message to the distribution server, to re-acquire the target segment from the distribution server.

Embodiment 4

Figure 4:
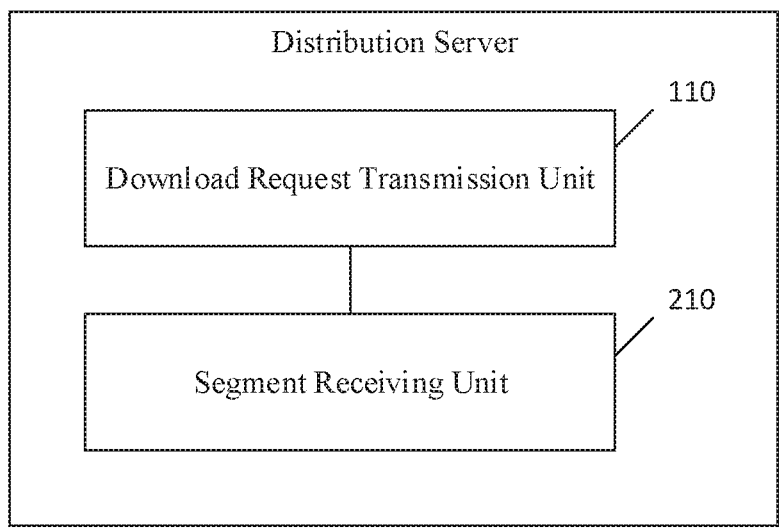
FIG. 4 is a structural diagram of a client terminal according to Embodiment 4 of the present disclosure.

Referring to FIG. 4, the present disclosure further provides a client terminal, and the client terminal includes:

a download request transmission unit 110 that is configured to acquire a download task, and transmit a file download request for a target file to a distribution server, where the target file includes one or more file segments and is unloaded by a file upload terminal, and the file download request includes an identifier of the target file and an identifier of a file segment; and a segment receiving unit 210 that is configured to, when a target segment corresponding to the identifier of the file segment of the target file has been uploaded to the distribution server, receive the target segment provided by the distribution server.

In one embodiment, the client terminal further includes:

a download suspending unit that is configured to receive a suspend instruction sent by the distribution server to suspend downloading the target file, when the target segment corresponding to the identifier of the file segment of the target file has not been uploaded to the distribution server.

In one embodiment, the client terminal further includes:

a re-download unit that is configured to execute a download process for another file in a download list, and re-transmit the file download request for the target file to the distribution server after finishing the execution of that download process, or re-transmit the file download request for the target file to the distribution server when a suspension duration reaches a specified duration threshold.

Each embodiment in this specification is described in a progressive manner. The same or similar parts in each embodiment may be referred to each other. Each embodiment focuses on the difference from other embodiments. In particular, for the embodiments with respect to the client terminals, reference may be made in detail to the foregoing embodiments of the file download methods.

It should be noted that the above-described client terminal and management server may work as separate devices in actual application scenarios, or the functions implemented by the two devices may be also integrated into the client terminal, to allow the client terminal to obtain a file list from the distribution server and build the download task. Therefore, each device covered by the present disclosure may work independently as a separate device, or some devices may be also integrated into a single device for job processing, which the present disclosure does not intend to limit. To those skilled in the art that understands the principles and spirits of the technical solutions of the present disclosure, the technical solutions obtained by separating or integrating the above-described devices should fall within the protection scope of the present disclosure.

Embodiment 5

Figure 5:
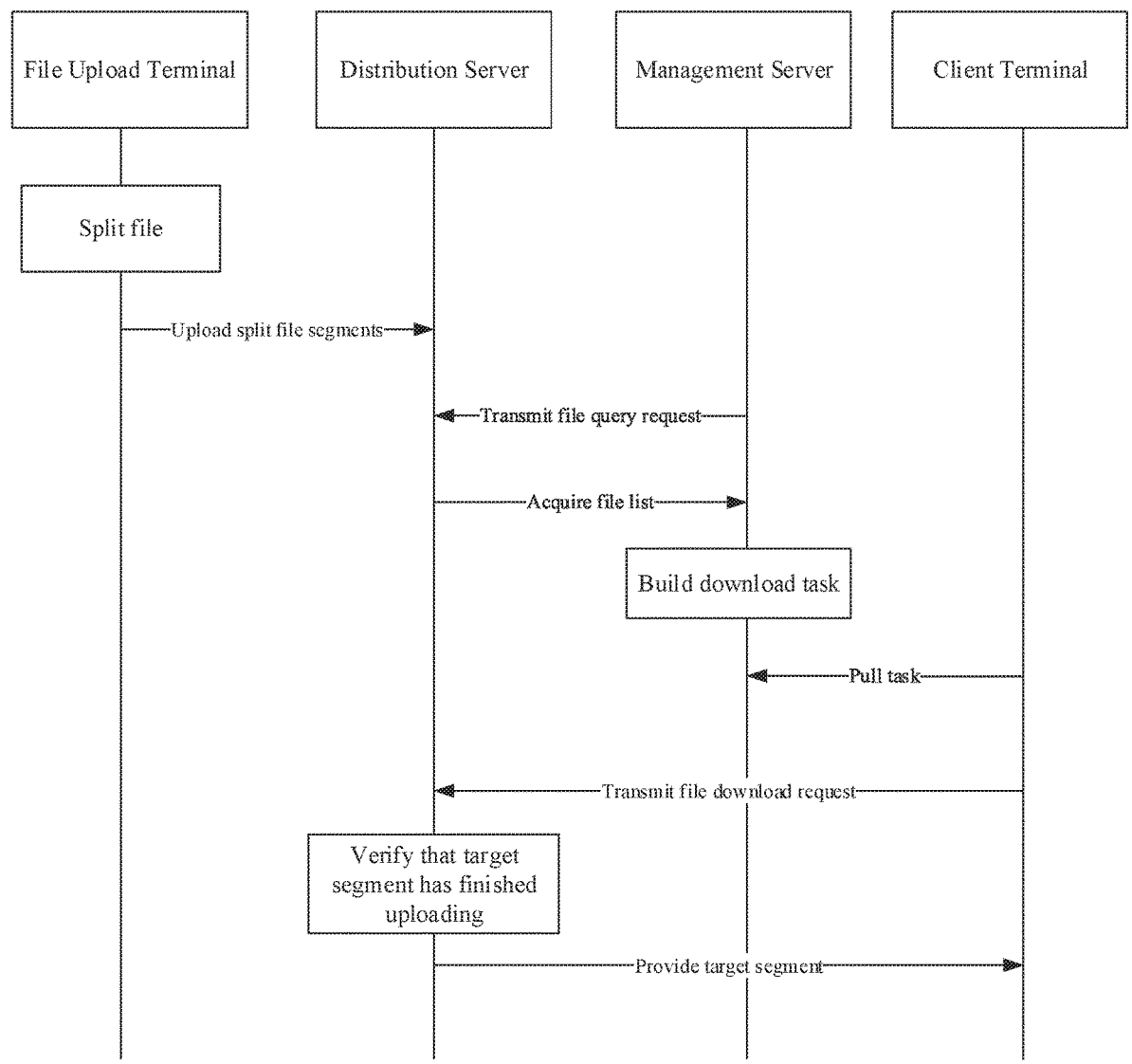
FIG. 5 is an interactive diagram of a file distribution system according to Embodiment 5 of the present disclosure.

Referring to FIG. 5, the present disclosure further provides a file distribution system. The system includes a file upload terminal, a management server, a distribution server, and a client terminal, where:

the file upload terminal is configured to upload a to-be-uploaded file to the distribution server, the to-be-uploaded file including one or more file segments;

the management server is configured to transmit a file query request to the distribution server to obtain a file list from the distribution server, the file list including at least an identifier for a file that is currently being uploaded, and build a download task corresponding to an identifier of a file included in the file list;

the client terminal is configured to acquire the download task from the management server, and transmit a file download request for a target file to the distribution server based on the download task, the file download request including an identifier of the target file and an identifier of a file segment; and the distribution server is configured to, when a target segment corresponding to the identifier of the file segment of the target file has been uploaded to the local, provide the client terminal with the target segment.

Embodiment 6

Figure 6:
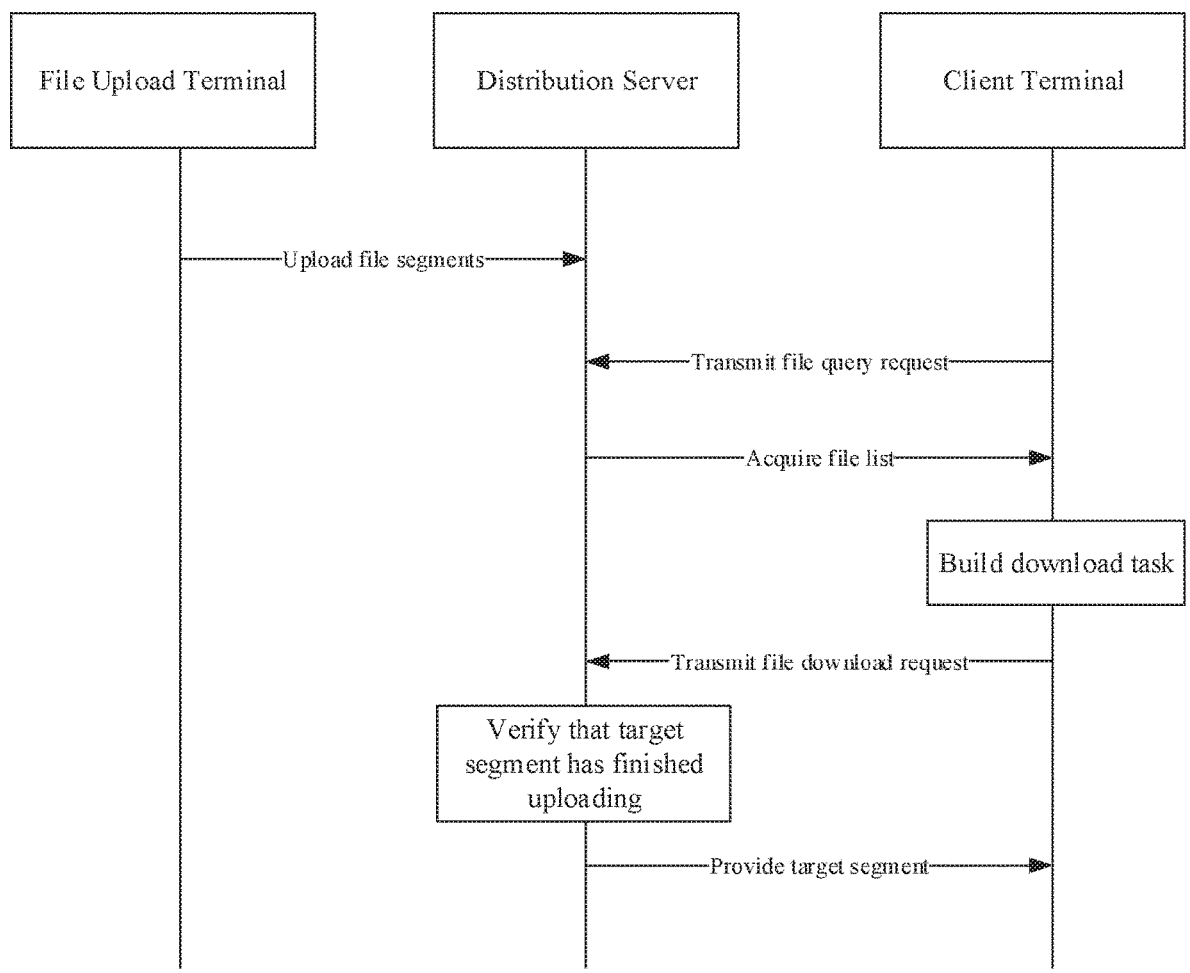
FIG. 6 is an interactive diagram of a file distribution system according to Embodiment 6 of the present disclosure.

Referring to FIG. 6, the present disclosure further provides a file distribution system. The system includes a file upload terminal, a distribution server, and a client terminal. The difference between Embodiment 6 and Embodiment 5 lies in that the client terminal and the management server may be combined into a single component. For example, the client terminal in Embodiment 6 includes a management server and retains the functions of the management server. Specifically:

the file upload terminal is configured to upload a to-be-uploaded file to the distribution server, the to-be-uploaded file including one or more file segments;

the client terminal is configured to transmit a file query request to the distribution server to obtain a file list from the distribution server, the file list including at least an identifier for a file that is currently being uploaded, build a download task corresponding to an identifier of a file included in the file list, acquire the download task, and transmit a file download request for a target file to the distribution server based on the download task, the file download request including an identifier of the target file and an identifier of a file segment; and the distribution server is configured to, when a target segment corresponding to the identifier of the file segment of the target file has been uploaded to the local, provide the client terminal with the target segment.

Each embodiment in this specification is described in a progressive manner. The same or similar parts in each embodiment may be referred to each other. Each embodiment focuses on the difference from other embodiments. In particular, for the embodiments with respect to the systems, reference may be made in detail to the foregoing embodiments for the methods.

As can be seen from the above, in the present disclosure, when the file upload terminal uploads a file to the distribution server, the distribution server may take the file as a downloadable file. At the same time, when uploading a file, the file upload terminal may upload the file based on the file segments, so as to ensure that the data amount of each file segment is small and the uploading speed is fast. In this way, once a file starts to get uploaded, the client terminal may create a download task for the file. As long as there is a file segment uploaded to the distribution server, the distribution server may provide the already uploaded file segment to the client terminal. That is, the client terminal may download the file from the distribution server without waiting until that the entire file has been uploaded by the file upload terminal. The client terminal may start to download the file gradually while the file is being uploaded by the file upload terminal. This saves the time of the client terminal to wait for the entire file to be uploaded, so that the client terminal may obtain the corresponding file more quickly, thereby reducing the required waiting time for the user.

The sequence numbers of the foregoing embodiments of the present disclosure are merely for descriptive purpose and do not represent the advantages and disadvantages of the embodiments.

Embodiments of the above-described mechanisms are described merely for the illustrational purpose. The units that are described as separate parts may or may not be physically separated, and the parts illustrated as units may or may not be physical units. That is, these units may be located in one location, or distributed across multiple network entities. Based on actual needs, some or all of the units may be selected to achieve the objectives of the disclosed embodiments, which those of ordinary skill in the art may understand and implement without taking creative efforts.

Through the foregoing description of the embodiments, it is clear to those skilled in the art that each embodiment may be implemented by means of software plus a necessary general hardware platform, and certainly, by means of hardware as well. Based on the understanding, the technical solutions, or essentially the parts that contribute to the current technology, may be embodied in the form of a software product. This computer software product may be stored in a computer-readable storage medium, such as a ROM/RAM, a magnetic disc, an optical disc, etc., and include a variety of instructions that cause a computing device (which may be a personal computer, a server, or a network device, etc.) to implement each embodiment or methods described in certain parts of each embodiment.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A file distribution method, comprising:
   receiving file information sent by a file upload terminal, and building a segment index for a to-be-uploaded file based on the file information, wherein the file information is stored in a memory, the segment index is stored in the memory and comprises an association relationship between an identifier for a file segment that has finished uploading and a storage path in a local memory for the file segment that has finished uploading;
   receiving a file query request sent by a terminal device, and in response to the file query request, feeding back a file list to the terminal device, the file list stored in the memory and comprising at least an identifier for a file currently being uploaded, wherein the file currently being uploaded comprises one or more file segments which split the file according to a specified data amount and is uploaded by the file upload terminal;
   receiving a file download request sent by the terminal device, the file download request comprising an identifier of a target file and an identifier of a file segment, wherein the identifier of the target file is located in the file list; checking whether there exists an identifier in a local segment index, corresponding to the file segment comprised in the file download request; and
   if there exists an identifier, in the local segment index, corresponding to the file segment comprised in the file download request, determining a target storage path associated with the identifier for the file segment in the local segment index, and providing the file segment stored under the target storage path to the terminal device; and wherein
   the file list further comprises an identifier for a file that has finished uploading, and accordingly, after receiving the file download request sent by the terminal device, the method further comprises:
   determining whether the identifier of the file segment comprised in the file download request is the identifier for the file currently being uploaded;
   if the identifier of the file segment comprised in the file download request is not the identifier for the file currently being uploaded, providing the terminal device with the target file that has finished uploading; and
   if the identifier of the file segment comprised in the file download request is the identifier for the file currently being uploaded, determining whether a target segment corresponding to the identifier of the file segment of the target file has finished uploading to the local memory.

2. The method according to claim 1, wherein the terminal device, further comprises a management server configured to send the file query request and receive the fed back file list, wherein the management server is configured to obtain an up-to-date file list from a distribution server at a fixed time interval, and create a download task for a corresponding file based on the identifiers of the files recorded in the file list, the management server only configured to create the download task for corresponding file, rather than itself actively download the file.

3. The method according to claim 1, further comprising:
   when the target segment corresponding to the identifier of the file segment of the target file has not been uploaded to the local memory, feeding back a suspend instruction to the terminal device, to allow the terminal device to suspend downloading the target file according to the suspend instruction.

4. The method according to claim 1, before receiving the file query request sent by the terminal device, the method further comprises:
   recording an upload status for each file segment of the to-be-uploaded file, wherein the upload status is stored in the memory and initially set as not uploaded, and when the file segment of the to-be-uploaded file has finished uploading, the upload status for the file segment that has finished uploading is changed to uploaded.

5. The method according to claim 4, further comprising:
   after receiving an instant file segment uploaded by the file upload terminal, determining a first check code corresponding to the received instant file segment, and comparing the determined first check code with a first check code sent by the file upload terminal for the instant file segment;
   if the two first check codes are the same, labelling an upload status of the instant file segment as uploaded; and
   if the two first check codes are different, deleting the received instant file segment from the local memory, and feeding back an error message to the file upload terminal, to allow the file upload terminal to re-upload the instant file segment.

6. The method according to claim 1, after receiving the file download request sent by the terminal device, the method further comprises:

if there does not exist an identifier, in the local segment index, corresponding to the file segment comprised in the file download request, feeding back a suspend instruction to the terminal device, to allow the terminal device to suspend downloading the target file according to the suspend instruction.

7. The method according to claim 1, after providing the target segment to the terminal device, the method further comprises:

determining a second check code corresponding to a received target segment using a hash algorithm, and compare a determined second check code with the second check code sent by a distribution server for the target segment;

if the two second check codes are the same, retaining the received target segment in the local memory; and if the two second check codes are different, deleting the received target segment from the local memory, and feeding back an error message to the distribution server to re-acquire the target segment from the distribution server.

8. A distribution server, comprising a processor and a memory electrically connected to the processor, the processor comprising:

a segment index building unit configured to receive file information sent by a file upload terminal, and build a segment index for a to-be-uploaded file based on the file information, wherein the file information is stored in the memory, the segment index is stored in the memory and comprises an association relationship between an identifier for a file segment that has finished uploading and a storage path in a local memory for the file segment that has finished uploading;

a file list feeding back unit configured to receive a file query request sent by a terminal device, and in response to the file query request, feed back a file list to the terminal device, the file list stored in the memory and comprising at least an identifier for a file currently being uploaded, wherein the file currently being uploaded comprises one or more file segments which split the file according to a specified data amount and is uploaded by the file upload terminal;

a file download request receiving unit configured to receive a file download request sent by the terminal device, the file download request comprising an identifier of a target file and an identifier of a file segment, wherein the identifier of the target file is located in the file list;

a segment checking unit configured to check whether there exists an identifier, in a local segment index, corresponding to the file segment comprised in the file download request; and a first processing unit configured to, if there exists an identifier, in the local segment index, corresponding to the file segment comprised in the file download request, determine a target storage path associated with the identifier for the file segment in the local segment index, and provide a file segment stored under the target storage path to the terminal device; and wherein the file list further comprises an identifier for a file that has finished uploading, and accordingly, after receiving the file download request sent by the terminal device, the processor is further configured to:

determine whether the identifier of the file segment comprised in the file download request is the identifier for the file currently being uploaded;

if the identifier of the file segment comprised in the file download request is not the identifier for the file currently being uploaded, provide the terminal device with the target file that has finished uploading; and if the identifier of the file segment comprised in the file download request is the identifier for the file currently being uploaded, determine whether a target segment corresponding to the identifier of the file segment of the target file has finished uploading to the local memory.

9. The distribution server according to claim 8, wherein the terminal device, further comprises a management server configured to send the file query request and receive the fed back file list, wherein the management server is configured to obtain an up-to-date file list from the distribution server at a fixed time interval, and create a download task for a corresponding file based on the identifiers of the files recorded in the file list, the management server only configured to create the download task for corresponding file, rather than itself actively download the file.

10. The distribution server according to claim 8, the processor further comprising:

a suspend instruction feeding back unit configured to, when the target segment corresponding to the identifier of the file segment of the target file has not been uploaded to the local memory, feed back a suspend instruction to the terminal device, to allow the terminal device to suspend downloading the target file according to the suspend instruction.

11. The distribution server according to claim 8, the processor further comprising:

an upload status recording unit configured to record an upload status for each file segment of the to-be-uploaded file, wherein the upload status is stored in the memory and initially set as not uploaded, and when a file segment of the to-be-uploaded file has finished uploading, the upload status for the file segment that has finished uploading is changed to uploaded.

12. The distribution server according to claim 8, the processor further comprising:

a second processing unit configured to, if there does not exist an identifier, in the local segment index, corresponding to the file segment comprised in the file download request, feed back a suspend instruction to the terminal device, to allow the terminal device to suspend downloading the target file according to the suspend instruction.

13. A terminal device, comprising a processor and a memory electrically connected to the processor, the processor comprising:

a segment index building unit configured to receive file information sent by a file upload terminal, and build a segment index for a to-be-uploaded file based on the file information, wherein the file information is stored in the memory, the segment index is stored in the memory and comprises an association relationship between an identifier for a file segment that has finished uploading and a storage path in a local memory for the file segment that has finished uploading;

a download request transmission unit configured to transmit a file query request to a distribution server to obtain a file list from the distribution server, the file list stored in the memory and comprising at least an identifier for a file that is currently being uploaded, the file currently being uploaded comprising one or more file segments which split the file according to a specified data amount and is uploaded by the file upload terminal, acquire a download task, and transmit a file download request for a target file to the distribution server, wherein the target file comprises one or more file segments and is uploaded by the file upload terminal, and the file download request comprises an identifier of the target file and an identifier of a file segment, the identifier of the target file located in the file list; and a segment checking unit configured to check whether there exists an identifier, in a local segment index, corresponding to the file segment comprised in the file download request; and a first processing unit configured to, if there exists an identifier, in the local segment index, corresponding to the file segment comprised in the file download request, determine a target storage path associated with the identifier for the file segment in the local segment index, and provide a file segment stored under the target storage path to the terminal device; and wherein the file list further comprises an identifier for a file that has finished uploading, and accordingly, after receiving the file download request sent by the terminal device, the processor is further configured to:

determine whether the identifier of the file segment comprised in the file download request is the identifier for the file currently being uploaded;

if the identifier of the file segment comprised in the file download request is not the identifier for the file currently being uploaded, provide the terminal device with the target file that has finished uploading; and if the identifier of the file segment comprised in the file download request is the identifier for the file currently being uploaded, determine whether a target segment corresponding to the identifier of the file segment of the target file has finished uploading to the local memory.

14. The terminal device according to claim 13, if the terminal device first downloads the target file, the terminal device is configured to add a file segment identifier corresponding to the first file segment of the target file to the file download request; if the terminal device has already downloaded certain file segments of the target file, and starts to resume downloading the target file, the terminal device is configured to check the identifiers of the file segments that have been downloaded to the local memory and determine the identifier of a next file segment to be downloaded, so that the identifier of the next to-be-downloaded file segment is added into the file download request.

15. The terminal device according to claim 13, the processor further comprising:

a download suspending unit configured to, when the target segment corresponding to the identifier of the file segment of the target file has not been uploaded to the distribution server, receive a suspend instruction sent by the distribution server, to suspend downloading the target file.

16. The terminal device according to claim 15, the processor further comprising:

a re-download unit configured to execute a download process for another file in a download list, and re-transmit the file download request for the target file to the distribution server after finishing the execution of the download process, or re-transmit the file download request for the target file to the distribution server when a suspension duration reaches a specified duration threshold.

17. The method according to claim 6, after suspending downloading the target file, the method further comprises:

inspecting a current download list, if there are other tasks that need to be downloaded in the download list, the terminal device is further configured to execute a download process for another file in the download list, and re-transmit the file download request for the target file to the distribution server after finishing the execution of the download process, or re-transmit the file download request for the target file to the distribution server when a suspension duration reaches a specified duration threshold.

18. The terminal device according to claim 13, the processor is further configured to record an upload status for each file segment of the to-be-uploaded file, wherein the upload status is stored in the memory and initially set as not uploaded, and when a file segment of the to-be-uploaded file has finished uploading, the upload status for the file segment that has finished uploading is changed to uploaded.

19. The terminal device according to claim 13, after receiving an instant file segment uploaded by the file upload terminal, the processor is further configured to determine a first check code corresponding to the received the instant file segment, and compare a determined first check code with a first check code sent by the file upload terminal for the instant file segment;

if the two first check codes are the same, the processor is configured to label an upload status of the instant file segment as uploaded; and if the two first check codes are different, the processor is configured to delete the received instant file segment from the local memory, and feed back an error message to the file upload terminal, to allow the file upload terminal to re-upload the instant file segment.

* * * * *